(12) United States Patent
Lomax, Jr. et al.

(10) Patent No.: US 7,923,409 B2
(45) Date of Patent: *Apr. 12, 2011

(54) CATALYST FOR HYDROGEN GENERATION THROUGH STEAM REFORMING OF HYDROCARBONS

(75) Inventors: Franklin D. Lomax, Jr., Arlington, VA (US); John Lettow, Washington, DC (US); Aaron L. Wagner, Rochester, NY (US); Jon P. Wagner, Louisville, KY (US); Duane Myers, Fairfax, VA (US)

(73) Assignees: SUD-Chemie Inc., Louisville, KY (US); L'Air Liquide Societe Anonyme Pour l'Etude et l'Exploitations des Procedes Georges Claude, Paris (FR)

( * ) Notice: Subject to any disclaimer, the term of this patent is extended or adjusted under 35 U.S.C. 154(b) by 501 days.

This patent is subject to a terminal disclaimer.

(21) Appl. No.: 11/874,265

(22) Filed: Oct. 18, 2007

(65) Prior Publication Data

US 2008/0038186 A1 Feb. 14, 2008

Related U.S. Application Data

(62) Division of application No. 10/825,150, filed on Apr. 16, 2004, now Pat. No. 7,309,480.

(51) Int. Cl.
*B01J 23/00* (2006.01)
*B01J 21/00* (2006.01)
*B01J 20/00* (2006.01)

(52) U.S. Cl. ........ 502/327; 502/332; 502/333; 502/334; 502/339; 502/355; 502/415; 502/439

(58) Field of Classification Search .................. 502/327, 502/332, 333, 334, 339, 355, 415, 439
See application file for complete search history.

(56) References Cited

U.S. PATENT DOCUMENTS

| | | | |
|---|---|---|---|
| 4,459,372 A | 7/1984 | Arena | |
| 4,572,904 A | 2/1986 | Onal | |
| 4,868,148 A | 9/1989 | Henk et al. | |
| 5,015,617 A | 5/1991 | Ohata et al. | |
| 5,026,536 A | 6/1991 | Shioiri et al. | |
| 5,318,765 A | 6/1994 | Binder et al. | |
| 5,786,294 A | 7/1998 | Sachtler et al. | |
| 5,830,822 A * | 11/1998 | Euzen ..................... | 502/355 |
| 5,849,659 A * | 12/1998 | Tanaka et al. ............ | 502/324 |
| 6,034,029 A | 3/2000 | Wulff-Döring et al. | |
| 6,413,489 B1 | 7/2002 | Ying et al. | |
| 6,509,000 B1 | 1/2003 | Choudhary et al. | |
| 6,562,747 B2 | 5/2003 | Symons et al. | |
| 6,576,804 B1 | 6/2003 | Heineke et al. | |
| 6,623,719 B2 | 9/2003 | Lomax et al. | |
| 6,670,303 B1 | 12/2003 | Heineke et al. | |
| 6,713,040 B2 | 3/2004 | Ahmed et al. | |
| 6,774,080 B2 * | 8/2004 | LaBarge et al. .......... | 502/170 |
| 6,869,584 B2 * | 3/2005 | Ying et al. .............. | 423/600 |
| 6,989,346 B2 | 1/2006 | Heineke et al. | |
| 7,094,730 B2 * | 8/2006 | LaBarge et al. .......... | 502/332 |
| 7,179,442 B2 | 2/2007 | Hagemeyer et al. | |

(Continued)

*Primary Examiner* — Cam N Nguyen
(74) *Attorney, Agent, or Firm* — Scott R. Cox

(57) ABSTRACT

A catalyst that can be used for the production of hydrogen from hydrocarbon fuels in steam reforming processes contains an active metal of, e.g., at least one of Ir, Pt and Pd, on a catalyst support of, e.g., at least one of monoclinic zirconia and an alkaline-earth metal hexaaluminate. The catalyst exhibits improved activity, stability in both air and reducing atmospheres, and sulfur tolerance.

25 Claims, 5 Drawing Sheets

U.S. PATENT DOCUMENTS

| | | | |
|---|---|---|---|
| 7,399,728 B2 * | 7/2008 | LaBarge | 502/325 |
| 7,442,669 B2 * | 10/2008 | Wickham et al. | 502/303 |
| 2002/0110519 A1 | 8/2002 | Ying et al. | |
| 2002/0127445 A1 | 9/2002 | Carpenter et al. | |
| 2002/0131915 A1 | 9/2002 | Shore et al. | |
| 2002/0141938 A1 | 10/2002 | Ruettinger et al. | |
| 2002/0174603 A1 | 11/2002 | Ahmed et al. | |
| 2003/0176278 A1 | 9/2003 | Wickham et al. | |
| 2003/0180215 A1 | 9/2003 | Niu et al. | |
| 2003/0185750 A1 | 10/2003 | Wang et al. | |
| 2003/0224931 A1 | 12/2003 | Yamamoto et al. | |
| 2004/0013591 A1 | 1/2004 | Ohtsuka et al. | |
| 2004/0014600 A1 | 1/2004 | Fukunaga | |
| 2004/0086432 A1 * | 5/2004 | LaBarge et al. | 422/177 |
| 2004/0208819 A1 * | 10/2004 | Anflo et al. | 423/600 |
| 2007/0116639 A1 | 5/2007 | Lomax, Jr. et al. | |

* cited by examiner

CATALYST FOR HYDROGEN GENERATION THROUGH STEAM REFORMING OF HYDROCARBONS

BACKGROUND OF THE INVENTION

1. Field of the Invention

The present invention relates to catalysts. In particular, the present invention relates to catalysts that can be used for the production of hydrogen from hydrocarbon fuels.

2. Discussion of the Background

Hydrogen production from natural gas, propane, liquefied petroleum gas, alcohols, naphtha and other hydrocarbon fuels is an important industrial activity. Hydrogen is used industrially in the metals processing industry, in semiconductor manufacture, in petroleum desulfurization, for power generation via electrochemical fuel cells and combustion engines, and as a feedstock in ammonia synthesis and other chemical processes.

Hydrogen is typically produced industrially from hydrocarbon fuels via chemical reforming using combinations of steam reforming and partial oxidation. Steam reforming of the simple hydrocarbon methane occurs via the following reaction:

$$CH_4 + H_2O \rightarrow CO + 3H_2$$

This reaction occurs in the presence of a catalyst and is highly endothermic. The extent of the reaction is low at low temperatures. In conventional reforming processes, a temperature as high as 800° C. is often required to convert an acceptable amount of hydrocarbon fuel into carbon monoxide and hydrogen.

The steam reforming catalyst typically employed in industrial reactors contains an active Ni metal component supported on a ceramic oxide containing a mixture of aluminum oxide with Ca or Mg. However, $O_2$ present in hydrocarbon fuel can cause the Ni to form nickel oxide, which is inactive as a steam reforming catalyst. The Ni metal can also react with the aluminum oxide of the support to form compounds that are catalytically inactive for steam reforming, such as nickel aluminate spinel. This detrimental interaction between active metal and support can significantly reduce catalyst activity over long periods of operation.

In some cases reforming catalyst is exposed to cyclic operation conditions of reactor shut-downs and restarts. This cyclic operation is more important for fuel cell and small scale hydrogen generation plants than for conventional large scale hydrogen production plants. During reactor shut-down, it is desirable that exposure of catalyst to air does not lead to a significant loss in catalytic activity. However, exposure of Ni to air during each cycle incrementally leads to reduced catalyst activity as the Ni becomes increasingly oxidized. Under these conditions, the oxidized nickel must be reduced if the Ni-based catalyst is to regain activity.

Because $O_2$ may be present at relatively high levels in hydrocarbon feeds, especially in natural gas obtained from a utility, a process for removing $O_2$ from the hydrocarbon must be included upstream of the reforming reactor to avoid oxidation of the Ni metal catalyst.

An additional problem with conventional Ni-based catalyst is that the Ni metal is susceptible to poisoning and deactivation by trace levels (~1 ppm) of sulfur (S) in the reacting hydrocarbon fluid. Removal of sulfur to levels acceptable for Ni-based reforming catalysts requires a hydrodesulfurization process and a sulfur absorption bed, both of which add to the complexity, cost and size of the reformer system.

Alternative catalysts for steam reforming processes have been proposed.

Rostrup-Nielsen, Jens R., *Catalytic Steam Reforming*, Springer-Verlag, Berlin, 1984, suggests that for steam reforming Rh and Ru are the most active catalysts, while Pt, Ni and Pd are all comparable, and Ir is less desirable.

U.S. Pat. No. 4,988,661 discloses hydrocarbon steam reforming catalysts having nickel oxide, cobalt oxide and/or platinum group noble metals supported on a carrier consisting essentially of aluminum oxide and an oxide of Ca, Ba and/or Sr.

U.S. Pat. No. 6,238,816 discloses sulfur-tolerant catalysts for hydrocarbon steam reforming. The catalysts contain active metals of Ag, Co, Cr, Cu, Fe, Pd, Pt, Ru, Rh, and/or V supported on various oxide materials.

While conventional hydrocarbon steam reforming catalysts provide improved initial activity and sulfur tolerance relative to Ni-based catalysts, conventional catalysts fail to provide stable performance over extended periods of time upon exposure to both air and reducing atmospheres. Conventionally, catalyst stability is measured in air. However, catalyst stability in air is no indication of catalyst stability in low oxygen and reducing environments.

SUMMARY OF THE INVENTION

The present invention provides a catalyst containing an active metal, such as Ir, Pt and/or Pd, on a stable, high surface area, catalyst support. The catalyst has improved sulfur tolerance, activity, and long-term stability in both air and reducing atmospheres.

The active metal is resistant to sulfur and can have a free energy of sulfide formation, $\Delta G°_{sulfide}$, less negative than about −50 kJ/mol at 527° C. and less negative than about −20 kJ/mol at 727° C. The term "$\Delta G°_{sulfide}$" as used herein refers to the free energy of sulfide formation for the reaction $H_2S + xMe \rightarrow H_2 + Me_xS$, where Me is the active metal and $Me_xS$ is the metal sulfide having the most negative free energy of formation at the reaction temperature.

The catalyst support includes at least one ceramic material, such as monoclinic zirconia and/or an alkaline-earth metal hexaaluminate, that retains a high surface area after exposure for 100 hours, at a temperature of about 750° C. and a pressure of about 100 psig, to atmospheres of both air and a reducing 75 vol % $H_2$/25 vol % $H_2O$ atmosphere.

Stable, high surface area, catalyst supports can be made by heat treating precursor materials in a low oxygen atmosphere, e.g., at a temperature of no more than 1100° C. in an atmosphere having an $O_2$ partial pressure of 0.20 atm or less and containing at least 50 vol % of at least one selected from the group consisting of $H_2$, $H_2O$ and an inert gas. The resulting catalyst supports do not require binders, and can be substantially single phase materials.

The catalyst of the present invention can be used to generate $H_2$ by hydrocarbon steam reforming using feedstreams contaminated with significantly more sulfur and oxygen than is conventionally feasible. The catalyst is tolerant of reduction-oxidation cycles. The stability of the support in both air and reducing atmospheres allows the active metal on the support to remain dispersed during hydrocarbon reforming. As a result, the catalyst retains its catalytic activity significantly longer than conventional catalysts.

BRIEF DESCRIPTION OF THE DRAWINGS

The preferred embodiments of this invention will be described in detail with reference to the following figures.

DETAILED DESCRIPTION OF PREFERRED EMBODIMENTS

Figure 1:
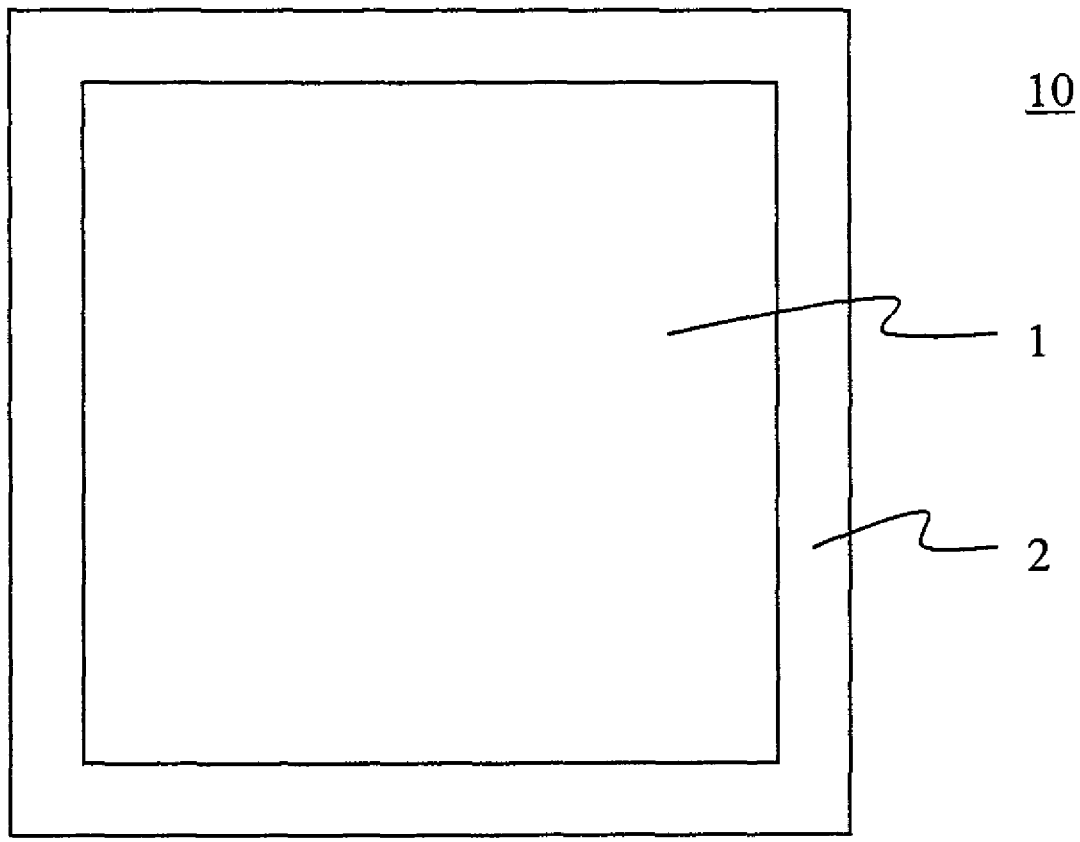
FIG. 1 shows a cross-sectional view of a catalyst pellet.

The catalyst of the present invention includes an active metal on a stable catalyst support.

In embodiments, the active metal comprises at least one of Ir, Pt and Pd. Preferably, the active metal has a free energy of sulfide formation, $\Delta G°_{sulfide}$, less negative than about $-50$ kJ/mol at 527° C. and less negative than about $-20$ kJ/mol at 727° C. More preferably, $\Delta G°_{sulfide}$ is less negative than about $-30$ kJ/mol at 527° C. and greater than about 0 kJ/mol at 727° C. The low affinity of the active metal for sulfur tends to make catalysts containing the active metal more tolerant of sulfur in feeds.

Preferably, the active metal has a melting point greater than about 1550° C. at a pressure of 1 atm. More preferably, the active metal has a melting temperature greater than 1750° C. at 1 atm. The relative high melting point of the active metal helps to prevent active metal dispersed on a catalyst support from agglomerating during catalyst use. Such agglomeration can lead to a reduction in active metal surface area and to a reduction in catalyst activity.

Table I lists $\Delta G°_{sulfide}$ and melting point for various metals. Ni, which is not a platinum group metal, has a $\Delta G°_{sulfide}$ significantly more negative than $-50$ kJ/mol at 527° C. and significantly more negative than about $-20$ kJ/mol at 727° C. Ru, which is a platinum group metal, has $\Delta G°_{sulfide}$ more negative than $-50$ kJ/mol at 527° C. and more negative than about $-20$ kJ/mol at 727° C. The melting point of Ru is 2310° C. Because $\Delta G°_{sulfide}$ for both Ni and Ru are so negative, catalysts based on Ni or Ru are highly susceptible to sulfur contamination.

In contrast to Ni and Ru, Table I shows that Pd, Pt and Ir each has a $\Delta G°_{sulfide}$ less negative than $-50$ kJ/mol at 527° C. and less negative than about $-20$ kJ/mol at 727° C. Pd, Pt and Ir also have melting points higher than 1550° C. Thus, Ir, Pd and Pt are preferred active metals. Ir is the active metal with the most preferred combination of $G°_{sulfide}$ and melting point.

TABLE I

| Metal/Sulfide | $\Delta G°_{sulfide}$ (kJ/mol at 527° C.) | $\Delta G°_{sulfide}$ (kJ/mol at 727° C.) | Metal Melting Point (° C.) |
|---|---|---|---|
| Ni/Ni$_3$S$_2$ | −98.4 | −95.3 | 1453 |
| Ru/RuS$_2$ | −70 | −57 | 2310 |
| Pd/PdS | −9 | −0.6 | 1552 |
| Pt/PtS | −16 | −9 | 1772 |
| Ir/Ir$_2$S$_3$ | −22 | 3 | 2410 |

The catalyst can contain from 0.01 to 6 wt %, preferably 0.1 to 4 wt %, of the active metal. The amount of active metal loaded on the catalyst is tailored to the process conditions (e.g., total pressure, temperature) under which the catalyst is used and to the feedstock composition (e.g., sulfur activity). At higher sulfur activity and lower temperatures the metal loading is generally increased, while at lower sulfur activity and higher temperatures the metal loading is generally decreased. The preferred loading may also be tailored to achieve a desired reaction rate to achieve preferred heat flux profiles within a reactor.

In addition to the active metal, the catalyst can contain at least one additional metal other than Ir, Pt and Pd. Preferably, the additional metal exhibits some catalytic activity. The additional metal need not meet the $\Delta G°_{sulfide}$ and melting point criteria set forth above for the active metal. Examples of the additional metal include Ni, Co and Ru, along with other metals known in the art of steam reforming. The addition of small amounts of Ir, Pt and/or Pd to conventional catalysts containing Ni, Co or Ru can reduce reaction initiation temperatures in the presence of one or more feedstock impurities and can also facilitate catalyst regeneration after poisoning by sulfiding, coking or oxidation.

Preferably, the active metal and any additional metal are each dispersed on the catalyst support. More preferably, each of the metals is uniformly dispersed on the catalyst support.

The catalyst support includes at least one ceramic material having improved stability in the low $O_2$ and reducing atmospheres encountered in hydrocarbon steam reforming processes.

Conventionally, catalyst supports are almost uniformly calcined in air during manufacture. As a result, these supports are stabilized in an air environment ($O_2$ partial pressure of 0.21 atm). However, the present inventors have found that ceramic stability in air is no guarantee of stability in the low $O_2$ and reducing atmospheres encountered in steam reforming.

The present inventors have found that thermodynamic instabilities in air stabilized supports can be identified by exposing the air stabilized supports to low $O_2$ environments. The present inventors have developed an aging test for uncovering ceramic materials having improved stability in low $O_2$ and reducing atmospheres.

The aging test involves exposing candidate materials for 100 hours, at a temperature of 750° C. and a pressure of 100 psig, to a 75 at % $H_2$/25 at % $H_2O$ atmosphere. The test can include cycling between air and the 75 at % $H_2$/25 at % $H_2O$ atmosphere. These test conditions are intended to mimic the most aggressive oxidation and reduction/hydrothermal conditions to which a catalyst will be exposed during steam reforming. Ceramic materials that pass the test can be used to form catalyst supports and catalysts having improved stability relative to conventional steam reforming catalyst materials.

The stability of the ceramic material during the 100 hour aging test is reflected in a lack of an appreciable change in the composition of the ceramic material during the test, as monitored by various diffraction techniques (e.g., x-ray diffraction) known in the art. During the 100 hour aging test, at least 80 vol %, preferably at least 90 vol %, more preferably at least 95 vol %, of the ceramic material remains in its original crystallographic phase.

Ceramic materials that can be used in the catalyst and catalyst support of the present invention include monoclinic zirconia (i.e., monoclinic $ZrO_2$) and alkaline-earth metal hexaaluminates (i.e., $MeO.6Al_2O_3$ or $MeAl_{12}O_{19}$, where Me is an alkaline-earth metal). Alkaline-earth metals include Ca, Ba, Sr and Ra. Preferably, the alkaline-earth metal in the hexaaluminate catalyst support is Ca, Ba or Sr. Barium hexaaluminate ($BaO.6Al_2O_3$ or $BaAl_{b\ 12}O_{19}$) is particularly preferred as the ceramic material for the catalyst support. The catalyst and catalyst support can include one or more of the monoclinic zirconia and alkaline-earth metal hexaaluminates. The catalyst and catalyst support can also include one or more ceramic materials in addition to the monoclinic zirconia and alkaline-earth metal hexaaluminates. However, preferably the catalyst support contains at least 95 vol %, more preferably at least 98 vol %, of at least one of the monoclinic zirconia and the alkaline-earth metal hexaaluminates. Even more preferably the catalyst support is a substantially single phase material.

After the 100 hour aging test, conventional catalyst supports have surface areas of about 2 $m^2$/g or less. In contrast, after the 100 hour aging test the catalyst support of the present invention can have a surface area of at least 6 $m^2$/g, preferably at least 12 $m^2$/g, more preferably at least 18 $m^2$/g. Surface areas can be measured by various techniques known in the art, for example nitrogen adsorption using the Brunauer, Emmett, and Teller (BET) technique. By retaining more surface area than conventional catalyst supports after the 100 hour aging test, the catalyst support of the present invention facilitates the continued dispersion and activity of the active metal on the support.

As a result of the stability of the catalyst support and the tolerance of the catalyst active metal to impurities in the hydrocarbon feed, the catalyst of the present invention has improved stability under a broad range of conditions. The stability of the catalyst upon long-term exposure to hydrocarbon feeds containing oxygen and sulfur compounds is reflected in a catalyst activity coefficient that, after the 100 hour aging test, is at least 50%, preferably at least 60%, more preferably at least 70%, of the activity coefficient of the catalyst before the aging test. The term "activity coefficient" as used herein has units of reciprocal time and refers to the ratio of the reaction rate to hydrocarbon concentration, assuming that the catalytic reaction is first order in the hydrocarbon concentration. In other words, assuming the reaction rate equation is r=kC, where r is the reaction rate (in units of, e.g., moles per second per liter) and C is the hydrocarbon concentration (in units of, e.g., moles per liter), the activity coefficient is k (in units of, e.g., $sec^{-1}$).

In preferred embodiments, the catalyst of the present invention comprises Ir on a monoclinic zirconia support. In other preferred embodiments, the catalyst comprises Ir on an alkaline-earth metal hexaaluminate support; in particular, Ir on a barium hexaaluminate support.

The catalyst supports of the present invention can be produced by conventional techniques known in the art. For example, precursor oxides can be mixed by ball milling and other techniques, and the mixed powder calcined in air at temperatures in excess of 1400° C. to form the support. The supports can also be synthesized using wet chemical techniques, such as co-precipitation of metal salts dissolved in solution, freeze-drying of metal salt-solutions or precipitates, spray drying of metal precursors, or spray pyrolysis of metal precursors, followed by calcination in air. Precursors for producing alkaline-earth metal hexaaluminates include alkaline-earth metal oxides, hydroxides, nitrates and alkoxides; and aluminum oxide, nitrate, hydroxides and alkoxides.

Monoclinic zirconia occurs naturally as the mineral baddeleyite. Monoclinic zirconia can also be made from zircon sand by processes known in the art. The monoclinic crystal structure provides a zirconia that is less dense than conventional stabilized zirconias having the tetragonal crystal structure.

Alkaline-earth metal aluminate catalyst supports produced by conventional techniques have relatively low surface areas. Conventionally, alkaline-earth metal aluminate precursors are heated in atmospheric air (partial pressure $O_2$ of 0.21 atm) at temperatures well above 1100° C. to form the thermodynamically stable hexaaluminate crystal structure. Calcination temperatures of greater than 1400° C. in air are often required to form pure $BaAl_{12}O_{19}$. However, these high temperatures lead to significant amounts of sintering and densification in conventional hexaaluminate supports. The high calcination temperatures result in stable, but low surface area, supports.

Surprisingly, the present inventors have found that higher surface area catalyst supports of almost pure alkaline-earth metal hexaaluminate can be formed by heating precursors in low $O_2$ atmospheres (i.e., at partial pressures of $O_2$ less than the 0.21 atm $O_2$ of air) and at relatively low temperatures of 1100° C. or less. In embodiments of the present invention the precursor material is heated at a temperature of no more than 1100° C., preferably no more than 950° C., more preferably no more than 800° C., in a low $O_2$ atmosphere having an $O_2$ partial pressure of 0.20 atm or less, preferably 0.10 atm or less, more preferably 0.01 atm or less, and containing at least 50 vol %, preferably at least 75 vol %, more preferably at least 90 vol%, of at least one selected from the group consisting of $H_2$, $H_2O$ and an inert gas. Inert gases include substantially unreactive gases such as $N_2$ and noble gases such as He, Ne, Ar, Kr and Xe. The heating in a low $O_2$ atmosphere of the present invention includes heating in a vacuum at a total pressure of less than 1 atm. The heating in a low $O_2$ atmosphere of the present invention also includes heating at a total pressure of greater than 1 atm. The alkaline-earth metal hexaaluminate produced by the low temperature process can have relatively stable surface areas of 6 $m^2$/g, preferably 12 $m^2$/g, more preferably 18 $m^2$/g. These surface areas are in excess of the hexaaluminate surface areas obtained using conventional calcination temperatures of greater than 1100° C.

As discussed above, barium hexaaluminate (i.e., $BaAl_{12}O_{19}$ or $BaO.6Al_2O_3$) is a preferred catalyst support. The barium hexaaluminate support can be made by first preparing a barium aluminate sample by coprecipitation of barium and aluminum precursors in a Ba:Al molar ratio of about 1:12 from an aqueous solution. The precipitate is then dried and calcined in air at around 1100° C. The calcined barium aluminate sample is then placed in a reactor and treated with 75 vol % $H_2$/25 vol % $H_2O$ at a temperature of about 950° C. for no more than 100 hours to form a high surface area barium hexaaluminate material.

Optionally, the catalyst support material can be pressed into tablets, can be mixed with an additional material (e.g., binder) and extruded, or can be shaped using other techniques known to those skilled in the art. If additional materials are added during the shaping process, the combined material can be heat-treated in an atmosphere containing hydrogen, water, an inert gas or combinations thereof, to produce a high-surface area material that is stable under reducing conditions.

The heat treatment in a low $O_2$ atmosphere of the present invention can be conducted at different stages of the catalyst support manufacturing process. For instance, precursor material can be treated prior to mixing with a binder for forming a tablet or an extrudate. Alternatively, the treatment can be applied after the precursor is formed into a final shape. Repeated heat treatments can also be performed. For example, after precursors are first heat treated to form a high surface area, phase-stable powder and then processed into a tablet, extrudate or washcoat, the processed material can be heat treated a second time to stabilize the system. The heat treatment in a low $O_2$ atmosphere of the present invention can also be applied to finished catalyst support particles, manufactured using conventional air calcinations, before the addition of active catalyst metal. The treatment stabilizes the surface area of the support particles and prevents the loss of active metal surface area that would result from encapsulation of active metal within a collapsing support structure.

The catalyst of the present invention can be produced by introducing the active metal of Ir, Pt and/or Pd and the optional additional metal onto the catalyst support. The metals can be introduced onto the support using various methods known in the art, such as impregnation, precipitation, and deposition. For example, metals can be introduced into a catalyst support by impregnating the support with an aqueous or organic solution of Ir, Pt and/or Pd salts. Organometallic complexes of Ir, Pt and/or Pd can be deposited onto a support to introduce the metal. Metal salts and complexes include chlorides, nitrates, acetates, acetylacetonates and oxylates. The metal dispersion can be optimized using techniques known in the art. For example, the active metal can be distributed homogeneously throughout the catalyst support pellet or particle in order to deter ripening of active metal crystallites and subsequent loss of active metal surface area. Alternatively, the active metal can be concentrated near the surface of a catalyst support pellet or particle. FIG. 1 shows such an embodiment. FIG. 1 shows a cross-sectional view of a catalyst pellet 10, which comprises a catalyst support inner region 1 surrounded by a catalyst support outer region 2, where the outer region 2 comprises more dispersed active metal, e.g., Ir, (not shown) than the inner region 1.

In contrast to conventional catalysts, the catalyst of the present invention can be used in steam reforming processes in the presence of sulfur and $O_2$ for the production of hydrogen from fuel sources such as natural gas, liquefied petroleum gas, alcohols, naphtha, and other hydrocarbon fuels containing one or more of methane, ethane, propane and butane. The catalyst of the present invention is capable of operating in a hydrocarbon fuel feed containing 1 ppm by mass or more, 10 ppm by mass or more, even 100 ppm by mass or more, of sulfur. The catalyst of the present invention is insensitive to the presence of $O_2$ in the feed and is capable of operating in a hydrocarbon fuel feed containing 1 ppm by mass or more of oxygen atoms other than the oxygen atoms in steam. In embodiments, the catalyst of the present invention is capable of operating in a hydrocarbon fuel active feed containing 100 ppm by mass or more, e.g., 0.01 to 10 vol %, preferably 1 to 10 vol %, of $O_2$. Because the catalyst of the present invention is tolerant of sulfur and oxygen, it can be used in steam reforming without the costly pretreatment of hydrocarbon fuel (e.g., by partial oxidation, hydrodesulfurization, adsorption, absorption, etc.) to remove sulfur and $O_2$ that is typically required when conventional catalysts are used. The catalysts of the present invention provide optimal activity for reforming systems that operate more than 250 hours and on impure feeds, such as those found in systems for the production of hydrogen from hydrocarbon fuel such as natural gas, propane, naphtha, and other hydrocarbons containing sulfur. In preferred embodiments, the catalyst of the present invention can be used in a system for $H_2$ generation through steam reforming such as that disclosed in U.S. Pat. No. 6,497,856. The disclosure of U.S. Pat. No. 6,497,856 is incorporated by reference herein in its entirety.

A system incorporating the catalyst of the present invention is capable of quicker and simpler startup from a cold or idle condition than systems incorporating conventional catalysts. The catalyst of the present invention can be shut down from operation and restarted without the use of reducing or inert gas. This process simplification reduces reformer system cost relative to conventional systems by eliminating components. The simplification also improves safety and durability by reducing the number of interconnections, which can develop leaks in service.

In embodiments, the catalyst of the present invention can be used in steam reforming processes in which the catalyst is exposed one or more times to each of an active feedstream, which contains a gaseous hydrocarbon and steam, and an inactive feedstream, which comprises air and/or steam but less than 100 ppm by mass of the gaseous hydrocarbon. The inactive feedstream can contain 100 ppm by mass or more, e.g., 0.01 to 10 vol %, preferably 1 to 10 vol %, of $O_2$. In embodiments, the catalyst is exposed cyclically to the active and inactive feedstreams.

The catalysts of the present invention exhibit, relative to conventional catalysts, significantly improved activity and long-term stability under normal hydrocarbon steam reforming conditions.

EXAMPLES

Example 1

The activity of fresh catalysts containing Rh, Pt or Ir was compared with that of similar catalysts after aging.

Catalysts were prepared using a mixed calcium aluminate/alumina support loaded with 1 wt % Rh, Pt or Ir as active metal. The catalyst was synthesized by impregnating Rh, Pt, or Ir on a commercially available calcium aluminate/alumina support. The metals were deposited from an aqueous solution of the metal chloride or hexachloro-metal acid salt. After the supports were impregnated with the metal-containing solutions, the materials were dried at about 110° C. for 24 hours and then calcined in air at about 500° C.

Figure 2:
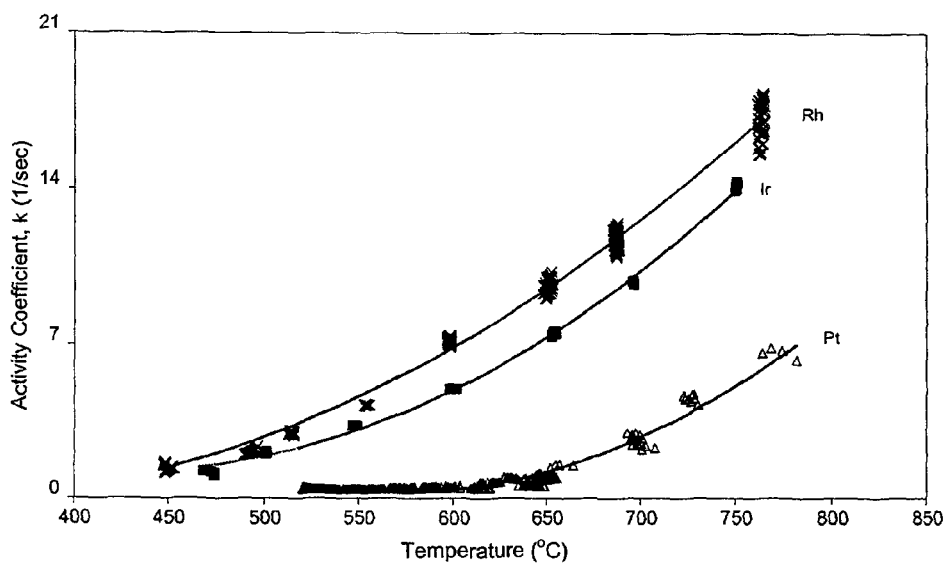
FIG. 2 shows the initial variation in activity coefficient with temperature of catalysts containing Ir, Pt or Rh supported on a mixture of $CaO.Al_2O_3$, $CaO.2Al_2O_3$, $CaO.6Al_2O_3$ and alumina in a neat hydrocarbon feed.

FIG. 2 shows the variation of activity coefficient with temperature for each of the fresh catalysts in neat hydrocarbon feeds of methane with water added in a steam-to-carbon (methane) ratio of about 4:1. All three fresh catalysts demonstrate activity within the temperature range of about 600° C. to 800° C.

Figure 3:
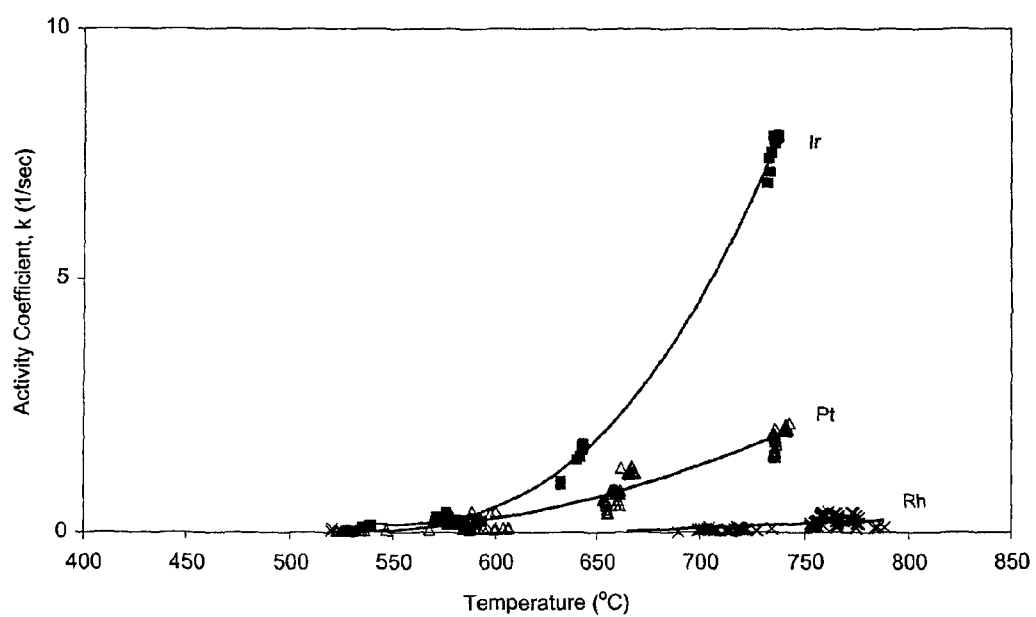
FIG. 3 shows the variation in activity coefficient with temperature of the catalysts used to produce FIG. 2 when the catalysts were exposed to a sulfur-containing hydrocarbon feed, after the catalysts had first been aged for 100 hours in a hydrocarbon/steam atmosphere.

FIG. 3 shows the variation of activity coefficient with temperature for each of the catalysts in sulfur-containing hydrocarbon feeds of methane containing approximately 10 ppm of sulfur in the form of hydrogen sulfide after the catalysts had first undergone 100 hours of aging at about 750° C. in about 175 psig of a hydrocarbon feed of line natural gas with water added in a steam-to-carbon ratio of about 4:1.

FIGS. 2-3 show that with hydrocarbon feed essentially uncontaminated by sulfur and/or oxygen, the fresh Rh-containing catalyst was more active than the fresh Ir- and Pt-containing catalysts. However, after the catalysts underwent the 100 hours aging test and were then subjected to hydrocarbon feed streams containing sulfur, the Ir-containing catalyst was more active than the Rh- and Pt-containing catalysts.

The stability of the Pt- and, in particular, Ir-containing catalysts relative to the Rh-containing catalyst is surprising. Conventionally active metals with higher initial activities (e.g., Rh) are favored for reforming catalysts. However, FIGS. 2-3 indicate that active metals with lower initial activity (e.g., Pt and Ir) can provide steam reforming catalysts with superior long-term performance, stability, and sulfur tolerance.

Example 2

The activity of catalysts containing Ir on different catalyst supports was compared.

A catalyst was prepared by impregnating 4 wt % Ir on a mixed calcium aluminate/alumina support. The metal was deposited from an aqueous solution of hexachloroiridic acid. After the support was impregnated with the metal-containing solution, the catalyst was dried at about 110° C. for 24 hours and then calcined in air at about 500° C. The catalyst was aged for about 5 days on a hydrocarbon feed containing sulfur and oxygen, at a steam-to-carbon molar ratio of about 4, and at an average temperature of about 750° C.

A second catalyst was prepared by impregnating 4 wt % Ir on a pure monoclinic zirconia support. The metal was deposited from an aqueous solution of hexachloroiridic acid onto a commercially available monoclinic zirconia support. After the support was impregnated with the metal-containing solution, the catalyst was dried at about 110° C. for 24 hours and then calcined in air at about 500° C. The second catalyst was then aged for about 11 days under conditions similar to those used for the mixed calcium aluminate/ alumina-supported catalyst.

Figure 4:
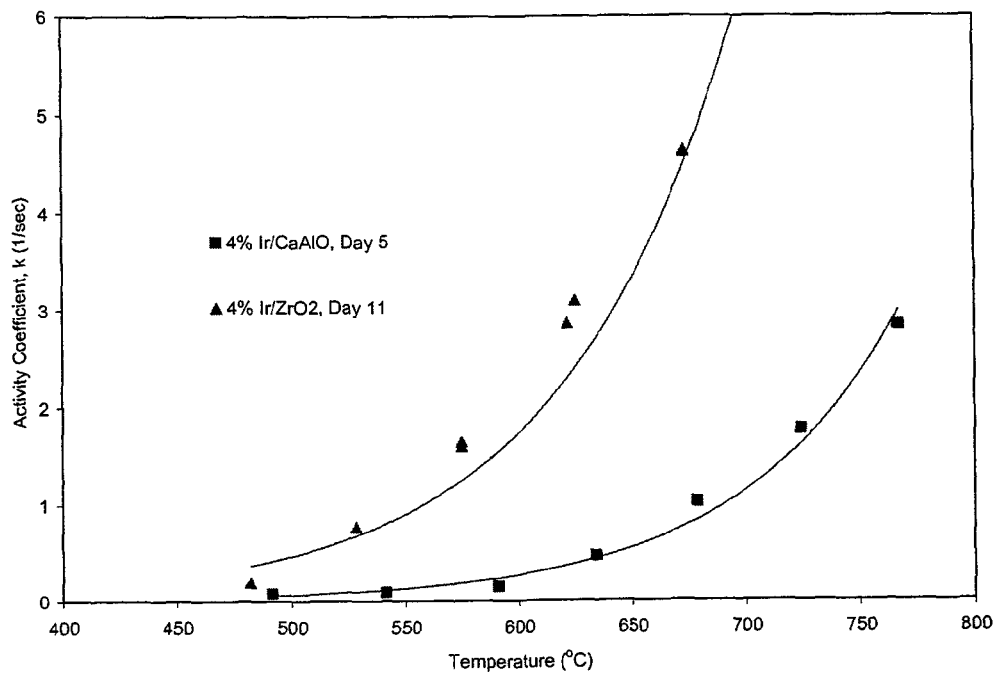
FIG. 4 compares the variation in activity coefficient with temperature of a catalyst containing 4 wt % Ir on a mixed calcium aluminate/alumina support, after aging for about 5 days, to that of a catalyst containing 4 wt % Ir on a monoclinic zirconia support, after aging under similar conditions for about 11 days.

FIG. 4 compares the variation in activity coefficient with temperature for the two aged catalysts. FIG. 4 shows that the activity of the catalyst with the pure monoclinic zirconia support was superior to that of the catalyst with the calcium aluminate/alumina support despite the longer aging time of the monoclinic zirconia supported catalyst.

Example 3

The stability of different catalysts upon aging was studied.

A catalyst was prepared by impregnating 2 wt % Ir on a mixed calcium aluminate/alumina support. The metal was deposited from an aqueous solution of hexachloroiridic acid onto a commercially available calcium aluminate/aluminate support. After the support was impregnated with the metal-containing solution, the catalyst was dried at about 110° C. for 24 hours and then calcined in air at about 500° C.

A second catalyst was prepared by impregnating 2 wt % Ir on a monoclinic zirconia support. The metal was deposited from an aqueous solution of hexachloroiridic acid onto a commercially available monoclinic zirconia support. After the support was impregnated with the metal-containing solution, the catalyst was dried at about 110° C. for 24 hours and then calcined in air at about 500°.

Each catalyst was placed in a reactor and aged for five days at about 750° C. in the presence of sulfur-containing hydrocarbon feeds with a steam-to-carbon ratio of about four. After aging, the catalysts were removed from the reactors and analyzed.

Figure 5:
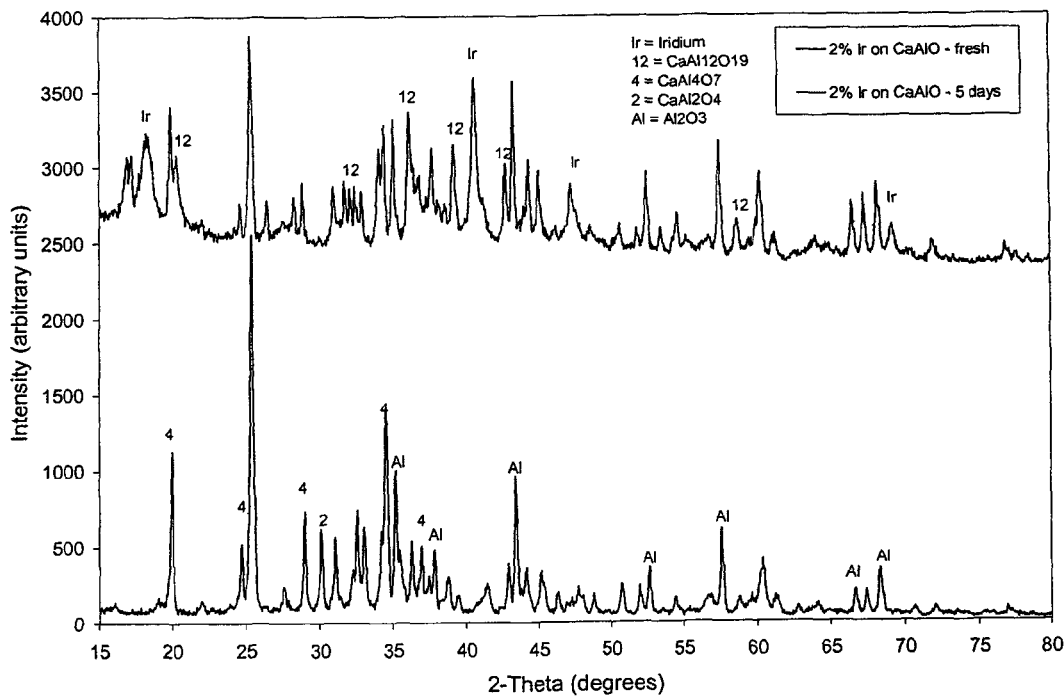
FIG. 5 compares x-ray diffraction patterns of fresh and aged catalysts containing 2 wt % Ir on a mixed calcium aluminate/alumina support.

FIG. 5 includes an x-ray diffraction pattern of the catalyst containing 2 wt % Ir on the mixed calcium aluminate/alumina support when the catalyst was fresh. For comparison, FIG. 5 also includes an x-ray diffraction pattern for the same catalyst after the catalyst was aged at 750° C. for 5 days in an atmosphere containing hydrogen and steam. FIG. 5 shows that initially the mixed calcium aluminate/alumina support contained at least four phases: $CaAl_2O_4$, $CaAl_4O_7$, $CaAl_{12}O_{19}$, and $Al_2O_3$. Despite the high loading of Ir on the catalyst, Ir diffraction peaks were not discernable in the fresh sample due to the high dispersion of the Ir on the support. FIG. 5 also shows that after aging the phase composition of the support had changed to predominately $CaAl_{12}O_{19}$ and $Al_2O_3$, with some $CaAl_4O_7$ remaining. After aging, Ir diffraction peaks were visible due to extensive agglomeration and sintering of the active Ir metal.

Figure 6:
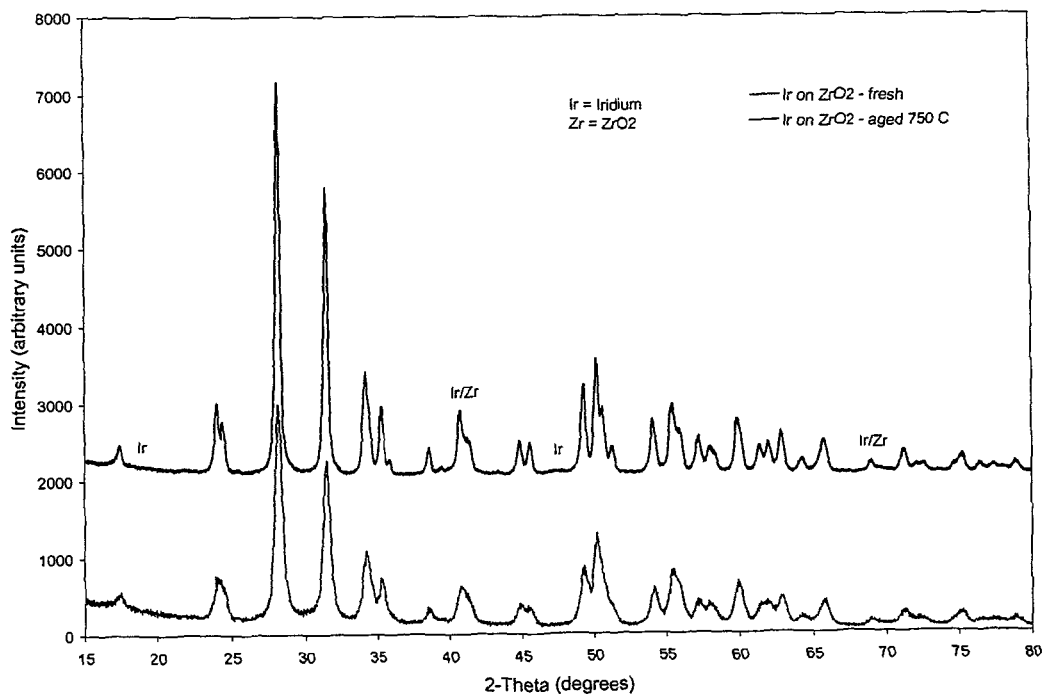
FIG. 6 compares x-ray diffraction patterns of fresh and aged catalysts containing 2 wt % Ir on a pure monoclinic zirconia support.

FIG. 6 includes an x-ray diffraction pattern of the second catalyst, containing 2 wt % Ir on the monoclinic zirconia support, when the catalyst was fresh. For comparison, FIG. 6 also includes an x-ray diffraction pattern for the same catalyst after the catalyst was aged at 750° C. for 5 days in an atmosphere containing hydrogen and steam. FIG. 6 shows that the zirconia-supported catalyst did not undergo a significant phase change after aging. Ir diffraction peaks are not discernable after the 5 days of aging, indicating that the active Ir metal was still well dispersed on the surface of the support.

Example 4

The stability of a barium aluminate catalyst support was studied.

A catalyst support of barium aluminate was prepared by first coprecipitating barium and aluminum precursors in a Ba:Al molar ratio of about 1:12 from an aqueous solution. The precipitate was then dried and calcined in air at 1100° C. for several hours. The catalyst support was placed in a reactor and aged in the presence of 75 vol % $H_2$ /25 vol % $H_2O$ at 950° C. for 4 days.

Figure 7:
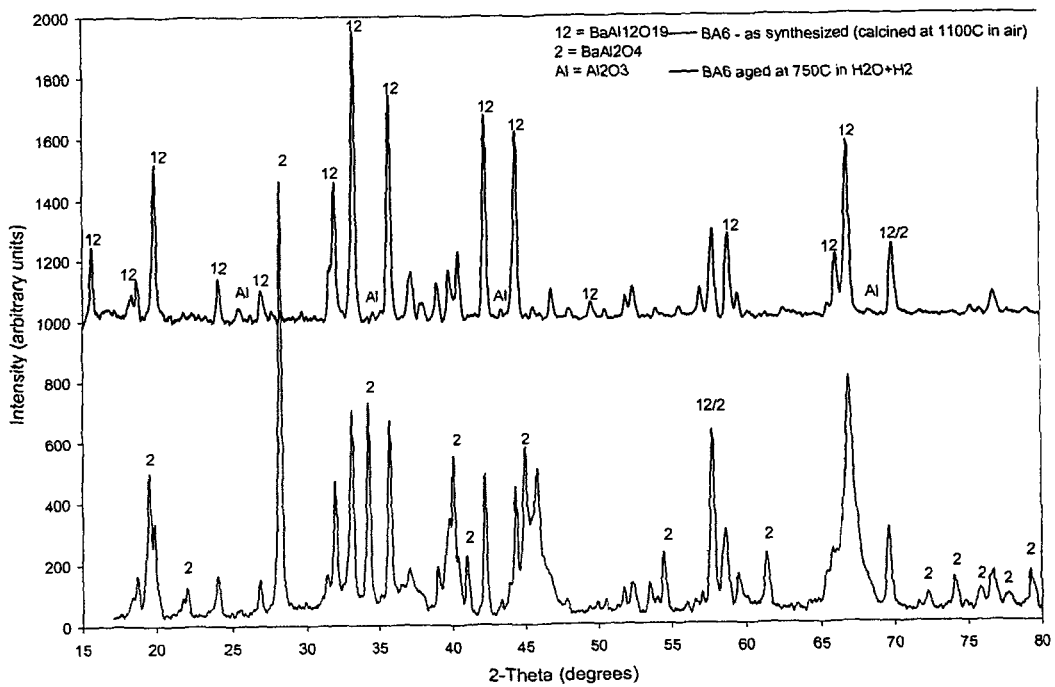
FIG. 7 compares x-ray diffraction patterns of fresh and aged barium aluminate supports.

FIG. 7 compares x-ray diffraction patterns of the fresh support with the aged support. Immediately after the calcination in air at 1100° C. the catalyst support still contained a mixture of $BaAl_2O_4$ and $BaAl_{12}O_{19}$ ($BaO.6Al_2O_3$ or BA6) phases. However, under the reducing/hydrothermal aging environment, the catalyst support converted to nearly 100% $BaAl_{12}O_{19}$. The aged $BaAl_{12}O_{19}$ catalyst support had a very stable specific surface area in excess of 15 $m^2/g$.

Example 5

The stability of different catalyst support materials was compared.

Catalyst supports were prepared from each of mixed calcium aluminate/alumina, nickel aluminate ($NiAl_2O_4$), monoclinic zirconia, and barium aluminate. Calcium aluminate/alumina and monoclinic zirconia supports were obtained from commercial sources. Nickel aluminate and barium hexaaluminate were respectively synthesized by the coprecipitation of nickel and aluminum precursors (in a ratio of 1:2) and barium and aluminum precursors (in a ratio of 1:12), followed by calcinations in air at 1100° C. Each of the catalyst supports was aged in the same atmosphere containing hydrogen and steam (i.e., 75 vol % $H_2$/25 vol % $H_2O$) for 100 hours at various aging temperatures.

Figure 8:
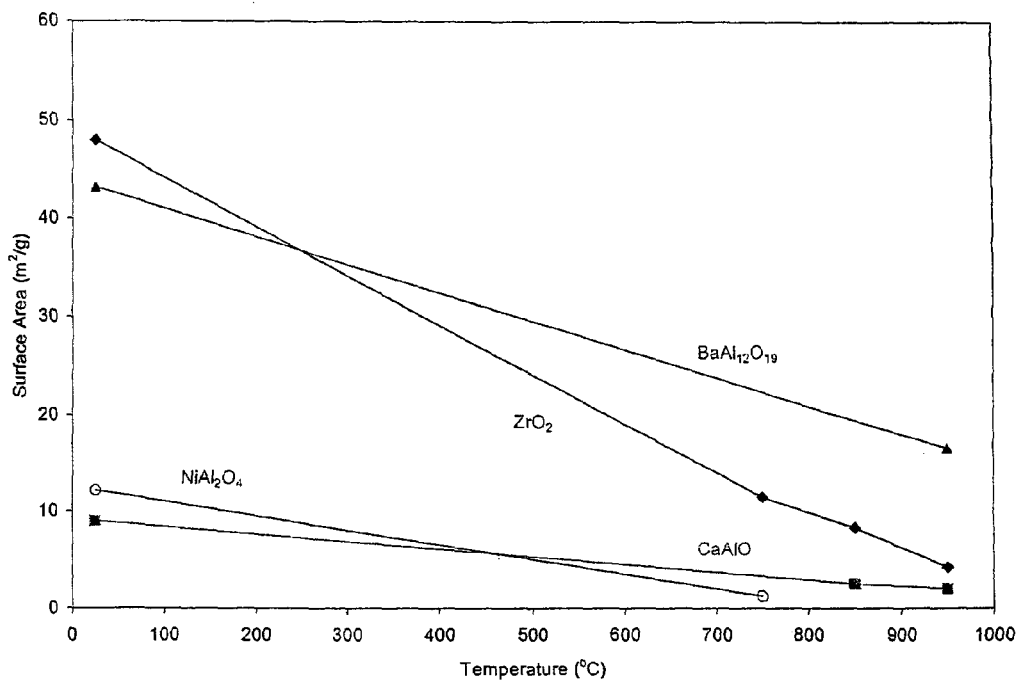
FIG. 8 compares the variation of surface area with aging temperature for aged catalyst supports of mixed calcium aluminate/alumina, nickel aluminate, monoclinic zirconia, or barium aluminate after each of the supports was aged in an atmosphere containing hydrogen and steam for 4 days.

FIG. 8 shows how the surface area of the four aged catalyst supports varied with aging temperature.

The surface area of both the aged mixed calcium aluminate and the aged $NiAl_2O_4$ was less than 10 $m^2$/g when the aging temperature exceeded about 200° C., and dropped to as low as about 3 $m^2$/g when the temperature exceeded 700° C. This is consistent with the theory that mixed calcium aluminate supports and $NiAl_2O_4$ supports are unstable in $H_2/H_2O$ atmospheres and undergo significant phase changes that are accompanied by significant loss of specific surface area.

In contrast to the aged mixed calcium aluminate and aged $NiAl_2O_4$ supports, the aged pure monoclinic zirconia and aged barium hexaaluminate supports had surface areas at about 750° C. in $H_2/H_2O$ environments in excess of 10 $m^2$/g. This indicates that pure monoclinic zirconia supports and alkaline-earth metal hexaaluminate supports are stable in $H_2/H_2O$ atmospheres and do not undergo significant phase changes once formed. The high stable surface area of pure monoclinic zirconia and alkaline-earth metal hexaaluminate supports maintains active metal dispersion even after hundreds of hours on-stream and results in higher long-term catalyst activity.

Example 6

The ability of the catalyst of the present invention to withstand cyclic operation (i.e., reactor operation, followed by shut-down, followed by restart) was studied.

A catalyst was prepared by impregnating about 1 wt % Ir onto a mixed calcium aluminate/alumina support. The metal was deposited from an aqueous solution of hexachoroiridic acid onto a commercially available calcium aluminate/alumina support. After the support was impregnated with the metal-containing solution, the catalyst was dried at about 110° C. for 24 hours and then calcined in air at about 500° C. The catalyst was divided into two approximately equal portions.

The first portion of the catalyst was placed in a reactor that operated continuously at about 750° C. for over 500 hours on a hydrocarbon feed that contained sulfur and $O_2$.

The second portion of the catalyst was placed in a reactor that was started up and allowed to run at 750° C. for about 24 hours on the same hydrocarbon/sulfur/$O_2$ feed as was used for the first portion. Then the reactor was shut down and purged with air. The reactor was then reheated to 750° C. and purged with steam prior to the next 24 hour feedstock-charged cycle. These steps were repeated for over 500 hours of total operating time. The cycling conditions are representative of the environments to which the catalyst would be exposed with normal reactor start-ups and shut-downs.

Figure 9:
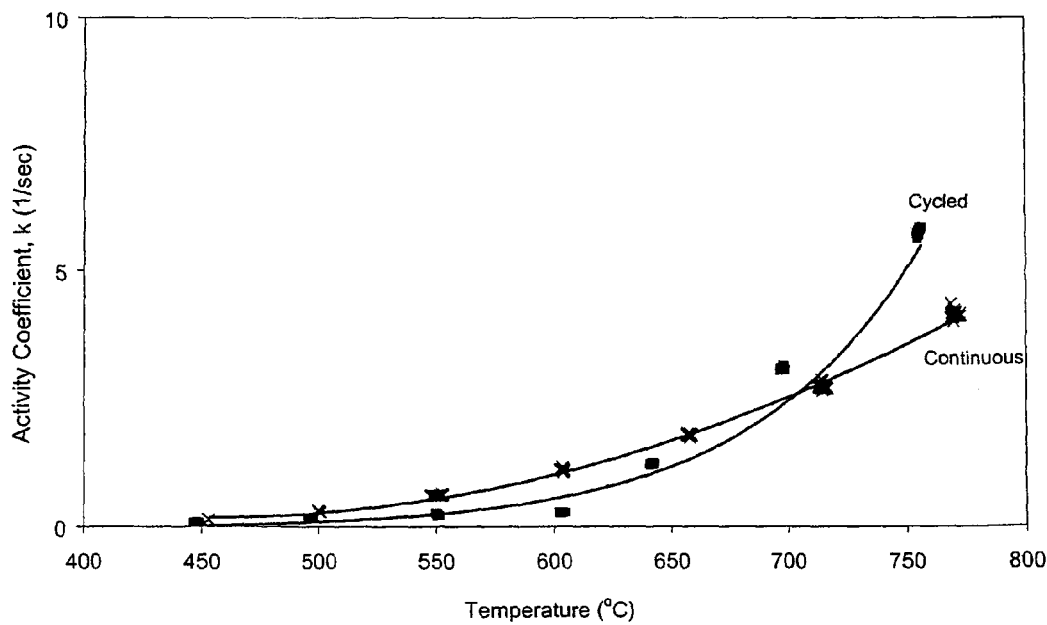
FIG. 9 compares the variation in activity coefficient with temperature of a catalyst containing 1 wt % Ir on a mixed calcium aluminate/alumina support, after 500 hours of continuous operation using feeds containing sulfur and oxygen, to that of the same catalyst after 500 hours of operation using the same feeds and with air cycling.

FIG. 9 compares, after the 500 hours tests, the variation in activity coefficient with temperature of the first portion catalyst (operated without air cycling continuously) to that of the second portion catalyst (operated with air cycling).

FIG. 9 shows that the catalyst of the present invention exhibits acceptable catalytic activity both in a reactor operated with air cycling and in a reactor operated without air cycling.

The disclosure herein of a range of values is a disclosure of every numerical value within that range. In addition, the disclosure herein of a genus is a disclosure of every species within the genus (e.g., the disclosure of the genus "noble gases" is a disclosure of every noble gas species, such as Ar, Kr, etc.).

While the present invention has been described with respect to specific embodiments, it is not confined to the specific details set forth, but includes various changes and modifications that may suggest themselves to those skilled in the art, all falling within the scope of the invention as defined by the following claims.

What is claimed is:

1. A supported steam reforming catalyst for steam reforming a feed stream containing at least 1 ppm of S comprising:
    95 vol % or more of one or more alkaline-earth metal hexaaluminate supports and one or more elements selected from the group consisting of Ir, Pd, and Pt,
    wherein the elements are dispersed on the support, and
    wherein the catalyst support has a surface area of 6 $m^2$/g or more.

2. The supported, steam reforming catalyst according to claim 1, wherein the catalyst support comprises 98 vol % or more of the alkaline-earth metal hexaaluminate.

3. The supported, steam reforming catalyst according to claim 1, wherein the catalyst support has a surface area of 12 $m^2$/g or more.

4. The supported, steam reforming catalyst according to claim 1, wherein the catalyst support has a surface area of 18 $m^2$/g or more.

5. The supported, steam reforming catalyst according to claim 1, wherein the alkaline-earth metal hexaaluminate comprises at least one alkaline-earth metal selected from the group consisting of Ca, Sr and Ba.

6. The supported, steam reforming catalyst according to claim 1, wherein the alkaline-earth metal hexaaluminate comprises $BaO_6Al_2O_3$.

7. A method of making the supported catalyst of claim 1, the method comprising
    heating at least one precursor oxide in an atmosphere having a partial pressure of $O_2$ of 0.20 atm or less and containing at least 50 vol % of at least one selected from the group consisting of $H_2$, $H_2O$ and an inert gas; and
    producing the catalyst support.

8. The method according to claim 7, wherein the inert gas is selected from the group consisting of He, Ne, Ar, Kr, Xe and $N_2$.

9. The method according to claim 7, wherein the atmosphere contains at least 50 vol % of $N_2$.

10. The method according to claim 7, wherein the heating is performed at a total pressure of 1 atm.

11. The method according to claim 7, wherein the heating is performed at a total pressure of less than 1 atm.

12. The method according to claim 7, wherein the heating is performed at a total pressure of greater than 1 atm.

13. The method according to claim 7, wherein the precursor oxides are heated in an atmosphere containing a partial pressure of $O_2$ of 0.10 atm or less.

14. The method according to claim 7, wherein the heating is at a temperature of no more than 1100° C.

15. The method according to claim 7, wherein the heating is at a temperature of no more than 950° C.

16. The method according to claim 7, wherein the heating is at a temperature of no more than 800° C.

17. The method according to claim 7, wherein the at least one precursor oxide comprises a member of the group consisting of alkaline-earth metal oxides.

18. The method according to claim 7, the method further comprising heating the at least one precursor oxide in another atmosphere having a partial pressure of $O_2$ greater than 0.20 atm.

19. The method according to claim 18, wherein the other atmosphere is air; and the total pressure in the other atmosphere is 1 atm.

20. The method according to claim 18, wherein the heating in the atmosphere having a partial pressure of $O_2$ of 0.20 atm or less and the heating in the other atmosphere having a partial pressure of $O_2$ greater than 0.20 atm are each repeated more than once.

21. A supported, steam reforming catalyst for steam reforming a feed stream containing at least 1 ppm of S comprising
   95 vol % or more of a support selected from the group consisting of one or more of alkaline-earth metal hexaaluminate and monoclinic zirconia, and
   an active metal comprising Ir,
   wherein the Ir is dispersed on the support.

22. The supported, steam reforming catalyst of claim 21 wherein the support comprises an alkaline-earth metal hexaaluminate wherein the alkaline-earth metal is selected from the group consisting of Ca, Sr, and Ba.

23. The supported, steam reforming catalyst of claim 22 wherein the alkaline-earth metal hexaaluminate comprises $BaO_6Al_2O_3$.

24. The supported, steam reforming catalyst of claim 21 wherein the support comprises monoclinic zirconia.

25. The supported, steam reforming catalyst of claim 21 wherein the active metal dispersed on the support consist essentially of Ir.

* * * * *